United States Patent
Pinnegar

(10) Patent No.: US 7,991,589 B2
(45) Date of Patent: Aug. 2, 2011

(54) POLARIZATION ANALYSIS AND POLARIZATION FILTERING OF THREE-COMPONENT SIGNALS USING THE S-TRANSFORM

(75) Inventor: Charles Robert Pinnegar, Calgary (CA)

(73) Assignee: Calgary Scientific Inc., Calgary, Alberta (CA)

( * ) Notice: Subject to any disclaimer, the term of this patent is extended or adjusted under 35 U.S.C. 154(b) by 1391 days.

(21) Appl. No.: 11/484,681

(22) Filed: Jul. 12, 2006

(65) Prior Publication Data

US 2007/0043458 A1     Feb. 22, 2007

Related U.S. Application Data

(60) Provisional application No. 60/697,965, filed on Jul. 12, 2005.

(51) Int. Cl.
 *H04B 15/00*     (2006.01)
(52) U.S. Cl. ......................................... 702/189; 702/17
(58) Field of Classification Search .................. 702/14, 702/17, 76, 77, 189
See application file for complete search history.

(56) References Cited

U.S. PATENT DOCUMENTS

| | | | |
|---|---|---|---|
| 5,781,502 A * | 7/1998 | Becquey | 367/31 |
| 6,407,702 B1 * | 6/2002 | Bergman et al. | 342/364 |
| 6,678,632 B1 | 1/2004 | Iannarilli, Jr. | |
| 6,967,617 B1 * | 11/2005 | McMillan et al. | 342/188 |
| 7,057,704 B2 | 6/2006 | Seul et al. | |

FOREIGN PATENT DOCUMENTS

WO     WO 03/023684 A1     3/2003

* cited by examiner

*Primary Examiner* — Manuel L Barbee
(74) *Attorney, Agent, or Firm* — Freedman & Associates

(57) ABSTRACT

The present invention relates to a method and system for processing time-varying three-component signals to determine polarization dependent features therefrom. Relation data indicative of a predetermined expression relating ellipse elements describing an ellipse in three dimensional space to the components of the three-component signal are provided. Received signal data indicative of a three-component signal are processed for transforming each component of the three-component signal into time-frequency domain providing second signal data. Data indicative of polarization dependent features are then determined using the relation data and the second signal data. The method and system for processing time-varying three-component signals according to the invention are highly beneficial in numerous applications for evaluating three-component signal data such as seismology.

16 Claims, 8 Drawing Sheets

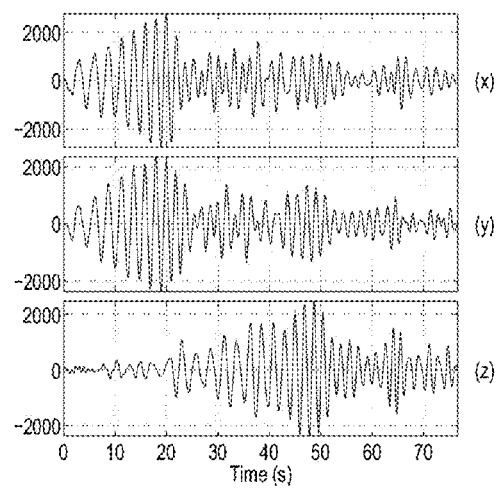
FIG. 2
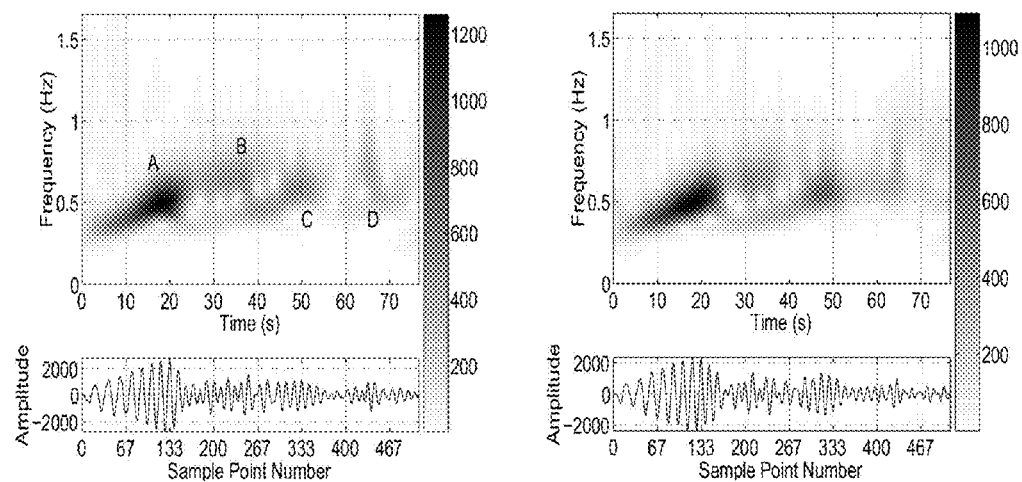
FIG. 3a
FIG. 3b

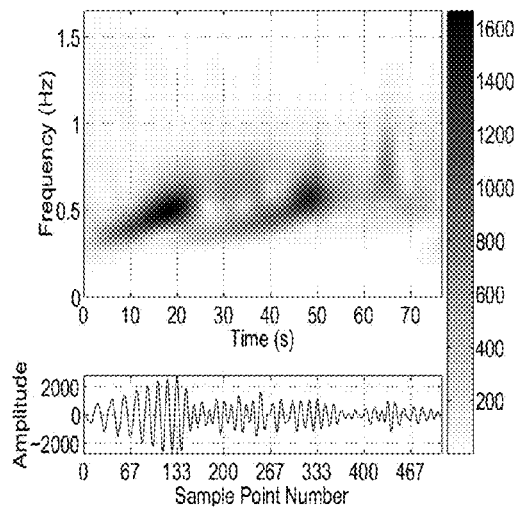
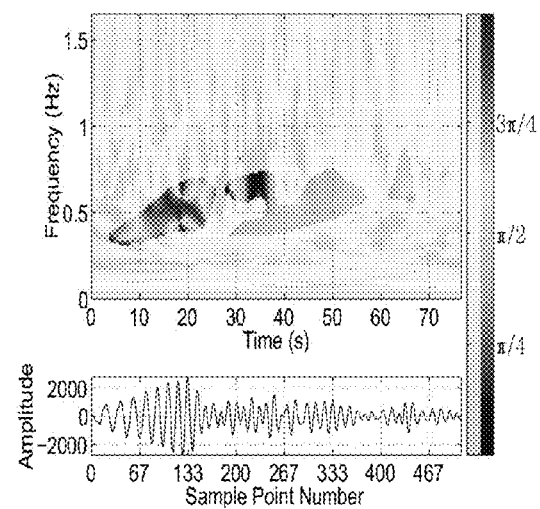
FIG. 5  FIG. 6a
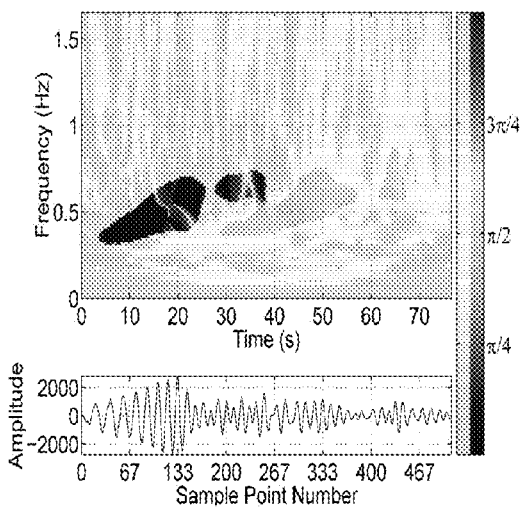
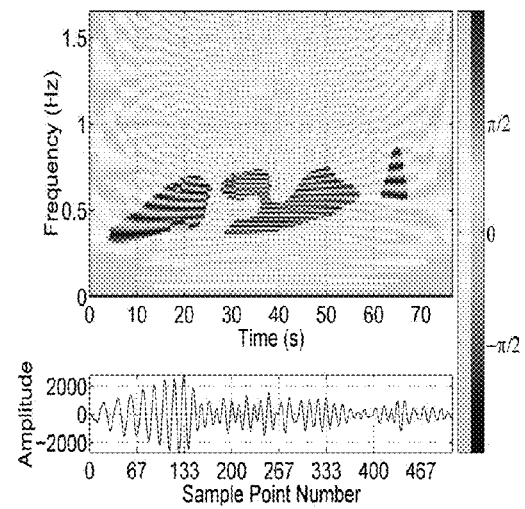
FIG. 6c  FIG. 6d

POLARIZATION ANALYSIS AND POLARIZATION FILTERING OF THREE-COMPONENT SIGNALS USING THE S-TRANSFORM

This application claims benefit from U.S. Provisional Patent Application No. 60/697,965 filed Jul. 12, 2005 the entire contents of which are incorporated herein by reference.

FIELD OF THE INVENTION

This invention relates to signal processing and in particular to a signal processing method and system for polarization analysis and polarization filtering of three-component signals using the S-transform.

BACKGROUND OF THE INVENTION

In numerous applications it is necessary to process time-varying three-component signals for analysis and filtering based on polarization properties. Some examples are measurements of time-varying electric and magnetic fields, and three-component seismograms.

The Fourier transform of a function has served as the most important transform in numerous signal processing applications and is still widely used in signal analysis. Standard Fourier analysis reveals individual frequency components involved in a signal. However, in many situations where frequencies change with time or space the standard Fourier analysis does not provide sufficient information. In numerous applications, a change of frequencies with time or space reveals important information.

Time-Frequency Representations (TFRs) are capable of localizing spectra of events in time, thus, overcoming the deficiency of the standard Fourier analysis and providing a useful tool for signal analysis in numerous applications. One such TFR is the Stockwell-transform (S-transform) disclosed in: Stockwell R. G., Mansinha L., Lowe R. P., "Localization of the complex spectrum: the S-transform", IEEE Trans. Signal Process, 1996; 44, 998-1001. The S-transform is a spectral localization transform that utilizes a frequency adapted Gaussian window to achieve optimum resolution at each frequency. Analogously, the S-transform is also capable of localizing spectra of events in space.

An $n^{th}$ complex coefficient of a Discrete Fourier Transform (DFT) of each individual component of a three-component signal gives amplitude and phase of a one-dimensional sinusoidal oscillation whose frequency is determined by n. When the DFT's of all three components are considered together, their $n^{th}$ complex coefficients provide amplitudes and phases of three sinusoidal oscillations in x, y, and z directions of a 3D space having the same frequency, resulting in an elliptically polarized motion in the 3D space. Analysis of the elliptically polarized motion reveals important polarization dependent information of the three-component signal.

It would be advantageous to provide a signal processing method and system for polarization analysis and polarization filtering of time-varying three-component signals based on the elliptically polarized motion in the 3D space and, in particular, based on polarization ellipses that depend on both time and frequency.

SUMMARY OF THE INVENTION

It is, therefore, an object of the invention to provide a signal processing method and system for polarization analysis of time-varying three-component signals based on polarization ellipses that depend on both time and frequency.

It is further an object of the invention to provide a signal processing method and system for polarization filtering of time-varying three-component signals based on polarization ellipses that depend on both time and frequency using the S-transform.

In accordance with the present invention there is provided a method for processing signal data to determine polarization dependent features therefrom comprising:

a) providing relation data indicative of a predetermined expression relating ellipse elements describing an ellipse in three dimensional space to components of a three-component signal with each component corresponding to one of three coordinates in the three dimensional space, wherein each component of the three-component signal is related to one of time and coordinates of a second other space and wherein each component of the three-component signal is transformed into one of time-frequency domain and space-frequency domain, respectively;

b) receiving the signal data, the signal data being indicative of a three-component signal with each component corresponding to one of the three coordinates in the three dimensional space, wherein each component of the three-component signal is related to one of time and the coordinates of the second other space, the three-component signal being indicative of a characteristic of one of an object and physical event;

c) processing the signal data for transforming each component of the three-component signal into one of time-frequency and space-frequency domain, respectively, providing second signal data; and, d) determining polarization dependent features using the relation data and the second signal data.

In accordance with the present invention there is further provided a storage medium having stored therein executable commands for execution on a processor, the processor when executing the commands performing:

a) receiving relation data indicative of a predetermined expression relating ellipse elements describing an ellipse in three dimensional space to components of a three-component signal with each component corresponding to one of three coordinates in the three dimensional space, wherein each component of the three-component signal is related to one of time and coordinates of a second other space and wherein each component of the three-component signal is transformed into one of time-frequency domain and space-frequency domain, respectively;

b) receiving the signal data, the signal data being indicative of a three-component signal with each component corresponding to one of the three coordinates in the three dimensional space, wherein each component of the three-component signal is related to one of time and the coordinates of the second other space, the three-component signal being indicative of a characteristic of one of an object and physical event;

c) processing the signal data for transforming each component of the three-component signal into one of time-frequency and space-frequency domain, respectively, providing second signal data; and, d) determining polarization dependent features using the relation data and the second signal data.

In accordance with the present invention there is yet further provided a system for processing signal data to determine polarization dependent features therefrom comprising:

an input port for receiving the signal data, the signal data being indicative of a three-component signal with each component corresponding to one of three coordinates in a three dimensional space, wherein each component of the three-component signal is related to one of time and coordinates of a second other space, the three-component signal being indicative of a characteristic of one of an object and physical event;

a processor in communication with the input port for:
  receiving relation data indicative of a predetermined expression relating ellipse elements describing an ellipse in the three dimensional space to components of a three-component signal with each component corresponding to one of the three coordinates in the three dimensional space, wherein each component of the three-component signal is related to one of time and coordinates of the second other space and wherein each component of the three-component signal is transformed into one of time-frequency domain and space-frequency domain, respectively;
  processing the signal data for transforming each component of the three-component signal into one of time-frequency and space-frequency domain, respectively, providing second signal data; and,
  determining data indicative of polarization dependent features using the relation data and the second signal data;

a storage medium in communication with the processor having stored therein the relation data; and, an output port in communication with the processor for providing the data indicative of polarization dependent features.

BRIEF DESCRIPTION OF THE FIGURES

Exemplary embodiments of the invention will now be described in conjunction with the following drawings, in which:

FIGS. 2 is a diagram illustrating three components of a three-component earthquake seismogram;

FIGS. 3a to 3c are diagrams illustrating discrete amplitude S-spectra for the x, y, and z components, respectively, of the seismogram shown in FIG. 2;

FIG. 5 is a diagram illustrating a "total power" S-spectrum;

FIGS. 6a to 6d are diagrams illustrating S-spectra of four elliptical terms I, $\Omega$, $\omega$, and $\phi$, respectively;

DETAILED DESCRIPTION OF THE INVENTION

Figure 1:
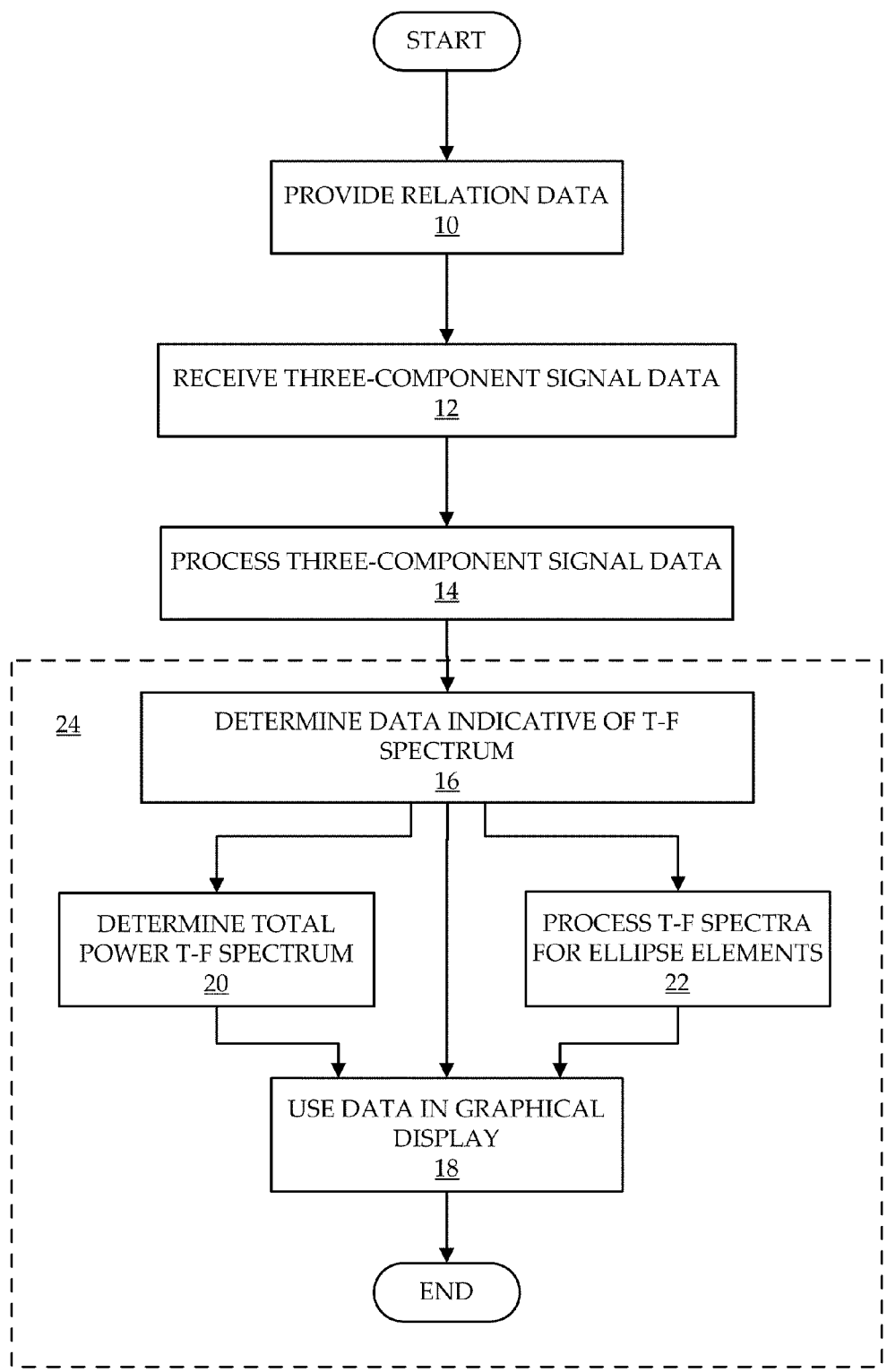
FIG. 1 is a flow diagram illustrating a method of signal processing for polarization analysis according to the invention.

For clarity and to define a number of quantities used in the description of the methods for polarization analysis and polarization filtering of time-dependent three-component signals using the S-transform according to the invention, basic properties of the Fourier Transform and the S-Transform are summarized below.

If x—a function of a continuous time variable t- and X—a function of a continuous frequency variable f—constitute a Fourier transform pair, then the mathematical relationship between x and X is described by the following equations:

$$X(f) = \int_{-\infty}^{\infty} x(t)\exp(-2\pi i f t)dt, \quad (1)$$

$$x(t) = \int_{-\infty}^{\infty} X(f)\exp(+2\pi i f t)df. \quad (2)$$

In general, X(f) is complex-valued, which is possible to express in terms of two real-valued functions, $X_R(f)$ and $X_I(f)$, real and imaginary parts of X(f)

$$X(f) = X_R(f) + iX_I(f). \quad (3)$$

For the following description it is safe to assume that x(t) is real-valued since x(t) denotes a measurable physical quantity. From this assumption follows that X(f)=X*(−f), with the asterisk denoting complex conjugation, allowing rearrangement of equation (2) to:

$$x(t) = 2\int_0^{\infty} (X_R(f)\cos(2\pi f t) - X_I(f)\sin(2\pi f t))df. \quad (4)$$

Combining the cosine and sine terms from the integrand of equation (4) into a single phase-shifted cosine term gives the following alternative representation of x(t):

$$x(t) = 2\int_0^{\infty} X_A(f)\cos[2\pi f t - X_\Phi(f)]df, \quad (5)$$

with $$X_A(f) = \sqrt{[X_R(f)]^2 + [X_I(f)]^2},$$

$$X_\Phi(f) = \arctan\left(\frac{-X_I(f)}{X_R(f)}\right) \quad (6)$$

being amplitude and phase spectra of X(f), respectively. In equation (6) and subsequent equations "arctan" denotes a 4-quadrant inverse tangent function when the argument is a fraction. An advantage of equation (5) over equation (4) is that a contribution of a particular frequency to x(t) is expressed in terms of the properties of a single function of time—the phase-shifted cosine in the integrant of equation (5)—instead of the properties of two different functions—the cosine and sine terms in the integrand of equation (4)—making equation (5) more suitable for intuitive interpretation.

A disadvantage of the Fourier transform is that x(t) is represented in Fourier domain in terms of infinite sinusoids having no time localization. Therefore, the Fourier transform is poorly suited for describing time localized spectral content. This disadvantage is overcome in the S-transform defined by:

$$X(\tau, f) = \int_{-\infty}^{\infty} x(t)\left\{\frac{|f|}{\sqrt{2\pi}}\exp\left[\frac{-f^2(\tau-t)^2}{2}\right]\right\} \times \exp(-2\pi i f t)dt. \quad (7)$$

The analyzing window of the S-transform is a Gaussian window function whose standard deviation is equal to one wavelength of the Fourier sinusoid. $X(\tau, f)$ comprises a real part $X_R(\tau, f)$ and an imaginary part $X_I(\tau, f)$, as well as an amplitude spectrum $X_A(\tau, f)$ and a phase spectrum $X_\Phi(\tau, f)$, whose definitions are analogous to equations (3) and (6). $X_A(\tau, f)$ and $X_\Phi(\tau, f)$ are indicative of a local amplitude and phase of a contribution a frequency f provides to x(t) within a few Fourier wavelengths of $t=\tau$. An alternative definition of $X(\tau, f)$ is obtained from the convolution theorem:

$$X(\tau, f) = \int_{-\infty}^{\infty} X(\alpha + f) \exp\left(\frac{-2\pi^2\alpha^2}{f^2}\right) \exp(2\pi i \alpha \tau) d\alpha \quad (8)$$

Here, $\alpha$ has a same unit as f. One property of the S-transform is its invertibility, i.e. it converges to X(f) when integrated over all values of $\tau$, $$\int_{-\infty}^{\infty} X(\tau, f) d\tau = X(f). \quad (9)$$

A three-component vector-valued function of time with x-, y-, and z-components denoted x(t), y(t), and z(t) is defined as follows:

$$\vec{r}(t) = \{x(t), y(t), z(t)\}. \quad (10)$$

By analogy with equations (1) to (4), y(t), and z(t) have Fourier transforms Y(f) and Z(f), whose real and imaginary parts are $Y_R(f) Y_I(f)$, $Z_R(f)$, and $Z_I(f)$. From equations (4) and (10) follows:

$$\vec{r}(t) = 2\int_0^\infty \vec{r}_f(t) df, \quad (11)$$

with $$\vec{r}_f(t) = \{X_R(f)\cos(2\pi ft) - X_I(f)\sin(2\pi ft),$$
$$Y_R(f)\cos(2\pi ft) - Y_I(f)\sin(2\pi ft),$$
$$Z_R(f)\cos(2\pi ft) - Z_I(f)\sin(2\pi ft)\}.$$

Here, $\vec{r}_f(t)$ denotes the contribution a frequency f provides to $\vec{r}(t)$. It is also possible to express equation (10) in terms of $X_A(f)$ and $X_\Phi(f)$, and the amplitude and phase spectra of Y(f) and Z(f) as follows:

$$\vec{r}(t) = 2\int_0^\infty \vec{r}_f(t) df, \quad (12)$$

with $$\vec{r}_f(t) = \{X_A(f)\cos[2\pi ft - X_\Phi(f)],$$
$$Y_A(f)\cos[2\pi ft - Y_\Phi(f)],$$
$$Z_A(f)\cos[2\pi ft - Z_\Phi(f)]\}.$$

However, equation (12) does not provide much advantage for interpretation compared with equation (11) because the content of $\vec{r}_f(t)$ is expressed in terms of the properties of three different functions—the phase-shifted cosines oscillating in the x-, y-, and z-directions. Therefore, it is desirable to express $\vec{r}_f(t)$ in terms of the properties of a single function in time. To this end, the separate oscillations in x-, y-, and z-direction are considered being vector coordinates of an ellipse in 3D-space. The elements of this ellipse completely describe the content of $\vec{r}_f(t)$:

(1) a(f), the semi-major axis of the ellipse (a(f)≧0);
(2) b(f), the semi-minor axis of the ellipse (a(f)≧b(f)≧0);
(3) I(f), the inclination of the ellipse to the horizontal (x, y) plane (0<I(f)<π); if I(f)<π/2, the particle motion is counterclockwise as viewed from a position having large displacement in the positive z-direction; if I(f)>π/2, the particle motion is clockwise;
(4) Ω(f), the azimuth of the ascending node—the point at which the function crosses the (x, y) plane in the positive z-direction—measured counterclockwise from {1, 0, 0} (−π<Ω(f)<π);
(5) ω(f), the angle between the ascending node and the position of maximum displacement (0<ω)(f)<π); and,
(6) φ(f), the phase, measured with respect to the time of maximum displacement (−π<φ(f)<π).
The values of ω(f) and φ(f) refer to one of two positions of maximum displacement having a positive z-coordinate.

To obtain the expressions of a(f), . . . , φ(f) in terms of $X_R$(f), . . . , $Z_I$(f), $X_R$(f), . . . , $Z_I$(f) are derived in terms of a(f), . . . , φ(f) and the result is inverted. To this end an ellipse $\vec{r}'(t)$ is constructed in 3D-space and defined by:

$$\vec{r}'(t) = \{a(f)\cos[2\pi ft - \phi(f)], b(f)\sin[2\pi ft - \phi(f)], 0\}. \quad (13)$$

Here, f is a frequency, and a(f), b(f), and φ(f) satisfy the above constraints. From equation (13) an arbitrarily oriented ellipse $\vec{r}_f(t)$ is derived by subjecting $\vec{r}'_f(t)$ to three rotations:

(1) a counterclockwise rotation through ω(f) about the z-axis, described by the matrix $$P_1 = \begin{pmatrix} \cos\omega(f) & -\sin\omega(f) & 0 \\ \sin\omega(f) & \cos\omega(f) & 0 \\ 0 & 0 & 1 \end{pmatrix}; \quad (14)$$

(2) a counterclockwise rotation through I(f) about the z-axis, described by the matrix $$P_2 = \begin{pmatrix} 1 & 0 & 0 \\ 0 & \cos I(f) & -\sin I(f) \\ 0 & \sin I(f) & \cos I(f) \end{pmatrix}; \text{ and,} \quad (15)$$

(3) a counterclockwise rotation through Ω(f) about the z-axis, described by the matrix $$P_3 = \begin{pmatrix} \cos\Omega(f) & -\sin\Omega(f) & 0 \\ \sin\Omega(f) & \cos\Omega(f) & 0 \\ 0 & 0 & 1 \end{pmatrix}. \quad (16)$$

Then:

$$\vec{r}_f(t) = P_3 P_2 P_1 \vec{r}'(t). \quad (17)$$

By combining equation (17) with equation (11) the following expressions for $X_R$(f), . . . , $Z_I$(f) are obtained:

$$X_R(f) = a(f)\cos\varphi(f)\{\cos\omega(f)\cos\Omega(f) - \sin\omega(f)\sin\Omega(f)\cos I(f)\} + \quad (18)$$
$$b(f)\sin\varphi(f)\{\sin\omega(f)\cos\Omega(f) + \cos\omega(f)\sin\Omega(f)\cos I(f)\},$$

$$X_I(f) = b(f)\cos\varphi(f)\{\sin\omega(f)\cos\Omega(f) + \cos\omega(f)\sin\Omega(f)\cos I(f)\} -$$

-continued $$a(f)\sin\varphi(f)\{\cos\omega(f)\cos\Omega(f) - \sin\omega(f)\sin\Omega(f)\cos I(f)\},$$

$$Y_R(f) = a(f)\cos\varphi(f)\{\cos\omega(f)\sin\Omega(f) + \sin\omega(f)\cos\Omega(f)\cos I(f)\} +$$

$$b(f)\sin\varphi(f)\{\sin\omega(f)\sin\Omega(f) - \cos\omega(f)\cos\Omega(f)\cos I(f)\},$$

$$Y_I(f) = b(f)\cos\varphi(f)\{\sin\omega(f)\sin\Omega(f) - \cos\omega(f)\cos\Omega(f)\cos I(f)\} -$$

$$a(f)\sin\varphi(f)\{\cos\omega(f)\sin\Omega(f) + \sin\omega(f)\cos\Omega(f)\cos I(f)\},$$

$$Z_R(f) = a(f)\cos\varphi(f)\sin\omega(f)\sin I(f) - b(f)\sin\varphi(f)\cos\omega(f)\sin I(f),$$

$$Z_I(f) = -a(f)\sin\varphi(f)\sin\omega(f)\sin I(f) - b(f)\cos\varphi(f)\cos\omega(f)\sin I(f)$$

Substitution of equations (18) into equation (11) provides the contribution of frequency f to $\vec{r}(t)$ in terms of the ellipse elements a(f), ..., φ(f).

The inversion of equations (18) then gives a(f), ..., φ(f) in terms of $X_R(f), \ldots, Z_I(f)$. Using the following abbreviations:

$$\begin{aligned}
A &= X_R^2 + X_I^2 + Y_R^2 + Y_I^2 + Z_R^2 + Z_I^2, \\
B &= X_R^2 - X_I^2 + Y_R^2 - Y_I^2 + Z_R^2 - Z_I^2, \\
Z &= -2(X_R X_I + Y_R Y_I + Z_R Z_I) \\
a, &\ldots, \varphi
\end{aligned} \tag{19}$$

are given as:

$$a = \frac{1}{\sqrt{2}}\sqrt{A + \sqrt{B^2 + C^2}},$$

$$b = \frac{1}{\sqrt{2}}\sqrt{A - \sqrt{B^2 + C^2}},$$

$$I = \arctan\left\{\frac{[(Z_R Y_I - Z_I Y_R)^2 + (Z_R X_I - Z_I X_R)^2]^{1/2}}{(Y_R X_I - Y_I X_R)}\right\},$$

$$\Omega = \arctan\left\{\frac{(Z_R Y_I - Z_I Y_R)}{(Z_R X_I - Z_I X_R)}\right\},$$

$$\omega = \arccos\left\{\frac{\cos(\Omega)[X_R\cos(\varphi) - X_I\sin(\varphi)]}{a} + \frac{\sin(\Omega)[Y_R\cos(\varphi) - Y_I\sin(\varphi)]}{a}\right\},$$

$$\varphi = \varphi_0 + \pi\text{sign}(C)\times\{\text{sign}\,[Z_R\cos(\varphi_0) - Z_I\sin(\varphi_0)] - 1\}/2,$$

where $\tag{20}$ $$\varphi_0 = \frac{1}{2}\arctan\left(\frac{C}{B}\right).$$

The f arguments have been deliberately omitted in equations (19) and (20) to generalize these expressions as will be discussed below.

In most applications $\vec{r}(t)$ is only known through a sampled time series $\vec{r}[\hat{t}T]$, defined by:

$$\vec{r}[\hat{t}T] = \{x[\hat{t}T], y[\hat{t}T], z[\hat{t}T]\}. \tag{21}$$

Here, $x[\hat{t}T]$, $y[\hat{t}T]$, and $z[\hat{t}T]$ are time sampled forms of x(t), y(t), and z(t), with $\hat{t}$ denoting an integer time index, and T denoting a sampling interval, thus $t = \hat{t}T$. The discrete version of X(f) is the DFT of $x[\hat{t}T]$:

$$X\left[\frac{\hat{f}}{NT}\right] = \sum_{\hat{t}=0}^{N-1} x[\hat{t}T]\exp\left(\frac{-2\pi i \hat{f}\hat{t}}{N}\right). \tag{22}$$

Here, $\hat{f}$ denotes an integer frequency index ($f = \hat{f}/NT$), and N is the number of samples in the time series. Similar equations give $Y[\hat{f}/NT]$ and $Z[\hat{f}/NT]$. By sampling equation (8) in frequency, these quantities are then used to calculate discrete S-transforms as follows:

$$X\left[\hat{\tau}T, \frac{\hat{f}}{NT}\right] = \sum_{\hat{\alpha}=-N/2}^{N/2-1} X\left[\frac{\hat{\alpha} + \hat{f}}{NT}\right]\exp\left(\frac{-2\pi^2\hat{\alpha}^2}{\hat{f}^2}\right)\exp\left(\frac{2\pi i\hat{\alpha}\hat{\tau}}{N}\right), \tag{23}$$

wherein $\tau = \hat{\tau}T$ and $\alpha = \hat{\alpha}/NT$. The discrete S-transforms of $y[\hat{t}T]$ and $z[\hat{t}T]$ are analogous to equation (23) and are denoted $Y[\hat{\tau}T,\hat{f}/NT]$ and $Z[\hat{\tau}T,\hat{f}/NT]$. In analogy with equation (3) these quantities are also expressed in terms of real and imaginary parts. For the discrete S-transform of $x[\hat{t}T]$ follows:

$$X\left[\hat{\tau}T, \frac{\hat{f}}{NT}\right] = X_R\left[\hat{\tau}T, \frac{\hat{f}}{NT}\right] + iX_I\left[\frac{\hat{f}}{NT}\right]. \tag{24}$$

Equations (19) and (20) then provide a convenient way of defining time-frequency spectra of the elements of the polarization ellipse. By substituting $X_R[\hat{\tau}T,\hat{f}/NT], \ldots, Z_I[\hat{\tau}T,\hat{f}/NT]$ in place of $X_R(f), \ldots, Z_I(f)$, discrete S-spectra of the elliptical elements, denoted $a[\hat{\tau}T,\hat{f}/NT], \ldots, \phi[\hat{\tau}T,\hat{f}/NT]$, are obtained. For brevity, the $[\hat{\tau}T,\hat{f}/NT]$ arguments of the discrete S-spectra will be omitted in the following description, except where they need to be included for clarity.

It is noted that the above equations (19) and (20) are derived based on the assumption that the ellipse elements are well defined. However, this assumption fails in some special cases with most of them leading to 0/0 indeterminacies in the definition of one or more of the ellipse elements a(f), ..., φ(f). Two examples are purely circular motion—for which ω is undefined, and purely linear motion—for which I and Ω are undefined. It is possible to address such special cases by modifying equation (18) to reflect the constraints of a special case and then deriving equations (19) and (20) therefrom. For example, in the case of b(f)=0—purely linear motion—equation (18) is modified based on the constraint that $$\omega = \frac{\pi}{2}$$

in equation (14) and derived therefrom. This results in a new set of equations for the ellipse elements a(f), ..., φ(f)—corresponding to equations (19) and (20)—in which I and Ω are well defined.

Referring to FIG. 1 a flow diagram of a method for polarization analysis according to the invention is shown. Referring to box 10, relation data indicative of a predetermined expression relating ellipse elements describing an ellipse in three dimensional space to time-dependent components of a three-component signal with each component corresponding to one of three coordinates in the three dimensional space are provided. The relation data are based on equations (19) and (20) and are provided, for example, on a storage medium such as a CD ROM. Signal data indicative of a three-component signal with each time-dependent component corresponding to one of the three coordinates in the three dimensional space are received—box 12. The three-component signal is indicative of a characteristic of an object or a physical event. For example, using polarization analysis it is possible to extract from three-component seismic signals information about composition and structure of the earth's crust—object—or, alternatively, information about a source of a seismic wave such as an earthquake, which is considered a physical event. The signal data are then processed—box 14—for transforming each component of the three-component signal into time-frequency domain 24 providing second signal data. In one embodiment, an S-transform is employed because the scalable S-transform window ensures that a same number of cycles of Fourier sinusoids are used to obtain local polarization properties at each time and each frequency. As will become evident to those of skill in the art, the S-transform is easily replaced in the method for polarization analysis according to the invention with other time-frequency transforms such as, for example, Gabor Transform (GT), Curvelet transform, Contourlet transform, Ridgelet transform, or Beamlet transform. After transformation, the second signal data are processed to determine data indicative of a time-frequency spectrum for at least one of the ellipse elements using the relation data—box 16. Using, for example, a graphical display, the time-frequency spectrum is then displayed—box 18—enabling a user to extract polarization dependent information therefrom. Optionally, data indicative of a total power time-frequency spectrum are determined—box 20. The data are then used in the graphical display—box 18—to indicate areas of the time-frequency spectrum having a total power exceeding a predetermined limit by, for example, changing brightness in these areas or superposing the total power time-frequency spectrum using lines of constant total power. Including information about the total power in a time-frequency spectrum for an ellipse element is helpful for extracting polarization dependent information therefrom, as shown below. Alternatively, other data then the data indicative of a total power spectrum are determined, if considered better suitable for extracting polarization dependent information. Further optionally, data indicative of time-frequency spectra for ellipse elements describing a semi-major axis and a semi-minor axis of the ellipse, respectively, are determined, followed by subtracting the time-frequency spectrum for the ellipse element describing a semi-minor axis of the ellipse from the time-frequency spectrum for the ellipse element describing a semi-major axis of the ellipse—box 22.

It is noted, that it is also possible to employ numerical methods for determining a, . . . , $\phi(f)$ in terms of $X_R(f)$, . . . , $Z_I(f)$, instead of the analytical solution—equations (19) and (20). However, as is evident to one skilled in the art, providing the relation data obtained through the analytical solution as in the method for polarization analysis according to the invention, signal processing is substantially facilitated by obviating the numerical iteration process and its drawbacks, such as substantially longer signal processing time, substantial data storage requirements for processing the signals during the numerical iteration process, and, likely, convergence problems associated with the numerical iteration process. Another advantage of the analytical solution is ease of manipulation of the polarization ellipse at each time and frequency. If, for example, it is desired to rotate the polarization ellipse to make its pitch equal to $\pi/2$, while holding its size, shape, strike and dip constant, all that is to be done is to set the value of $\omega$ to $\pi/2$ and the change effects the polarization ellipse immediately. Using a numerical method this is only accomplished by stepwise rotating the polarization ellipse in its plane until the vertical component of its major axis reaches a maximum. To achieve this, another numerical iteration process needs to be employed for stepwise rotating the polarization ellipse and for detecting the maximum of its major axis.

Figure 3C:
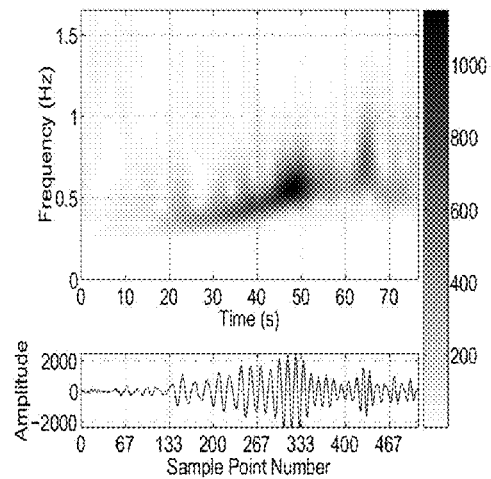

FIG. 2 illustrates a three-component broad band earthquake seismogram. The data set illustrated in FIG. 2 has been obtained by decimating the original seismogram from a sampling interval of 1 ms to a sampling interval of 150 ms by applying a Butterworth anti-aliasing filter to the original data. Easting, northing, and vertical traces give the x-, y-, and z-components of the total motion. Discrete amplitude S-spectra of these traces—$X_A$, $Y_A$, and $Z_A$—are shown in FIGS. 3*a* to 3*c*, respectively. In FIGS. 3*a* and 3*b*, a first large amplitude event—marked "A" in FIG. 3*a*—is the Love wave arrival, and the second—marked "C" in FIG. 3*a*—is the Rayleigh wave arrival. In FIG. 3*c*, only the Rayleigh wave arrival is clearly visible due to a small vertical amplitude of the Love wave oscillations. Events having a smaller amplitude—marked "B" and "D" in FIG. 3*a*—have Love wave and Rayleigh wave properties, respectively. These events represent higher order phases, or, alternatively, crustal wave packets of relatively high frequency whose arrival times have been delayed due to their shallow penetration depths.

Figure 4A:
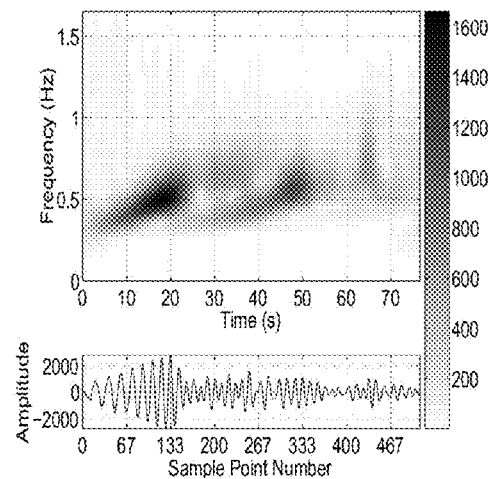
FIGS. 4a to 4c are diagrams illustrating a discrete semi-major axis S-spectrum, a discrete semi-minor axis S-spectrum, and their difference, respectively.
Figure 4B:
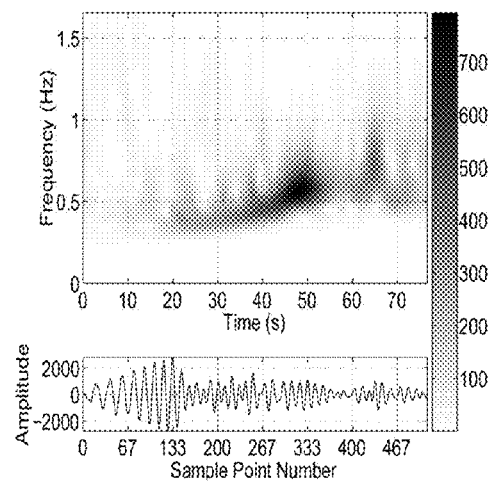
Figure 4C:
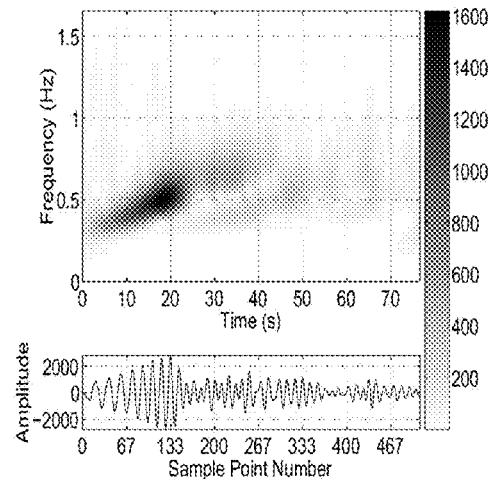

FIGS. 4*a* to 4*c* illustrate a discrete semi-major axis S-spectrum $X_a$, a discrete semi-minor axis S-spectrum $X_b$, and their difference $X_a$–$X_b$, respectively. Since it is possible to describe a total polarization ellipse as a pure circular motion of radius b phase-locked with, and superimposed upon, a pure linear motion of amplitude (a–b) in a plane of the circular motion, FIGS. 4*b* and 4*c* are considered a circular motion S-spectrum and a linear motion S-spectrum, respectively. Thus, the very small Love wave amplitude in FIG. 4*b* is a consequence of nearly linear particle motion. The Rayleigh wave signature shown in FIG. 4*a* has approximately 1.5 times the amplitude of the corresponding signature shown in FIG. 4*b*, leading to a linear motion amplitude, shown in FIG. 4*c*, of approximately half the amplitude of the signature shown in FIG. 4*b*. FIG. 5 illustrates a "total power" S-spectrum defined by $\sqrt{X_A^2+Y_A^2+Z_A^2}$, or in the notation of equation (9) $\sqrt{A}$.

The S-spectra of the other four elliptical elements I, $\Omega$, $\omega$, and $\phi$ are difficult to visually interpret because, unlike the S-spectra shown in FIGS. 3*a* to 5, they do not provide information about where on the $(\hat{\tau},\hat{f})$ plane the most significant contributions to the total signal are made. To this end, the amplitude at each pixel is denoted by one of two different shades of a same colour—or grey tone in a black and white representation. For example, brighter shades are assigned to pixels at which a total power—shown in FIG. 5—is larger than 500. This approach has been used in the diagrams shown in the following FIGS. 6*a* to 6*d*.

Referring to FIG. 6*a* the inclination S-spectrum I is plotted. For the Rayleigh wave signature I is approximately $\pi/2$, demonstrating that the plane of the time-local polarization ellipse is substantially vertical, which is not an unexpected result. The value of I is approximately constant over the extent of the Rayleigh wave signature on the $(\hat{\tau},\hat{f})$ plane. However, on the Love wave signature I varies over a large range because, for approximately linear simple harmonic particle motion, even small noise contributions lead to large changes in I. In the case of purely linear motion there is:

$$\frac{X_I}{X_R} = \frac{Y_I}{Y_R} = \frac{Z_I}{Z_R}, \qquad (25)$$

therefore, I, $\Omega$, and consequently o are undefined because terms of the form $Z_R Y_I - Z_I Y_R$ in equation (20) are equal to 0. Purely linear motion is unlikely to be encountered in real seismograms, since noise contamination will always introduce some ellipticity.

Figure 6B:
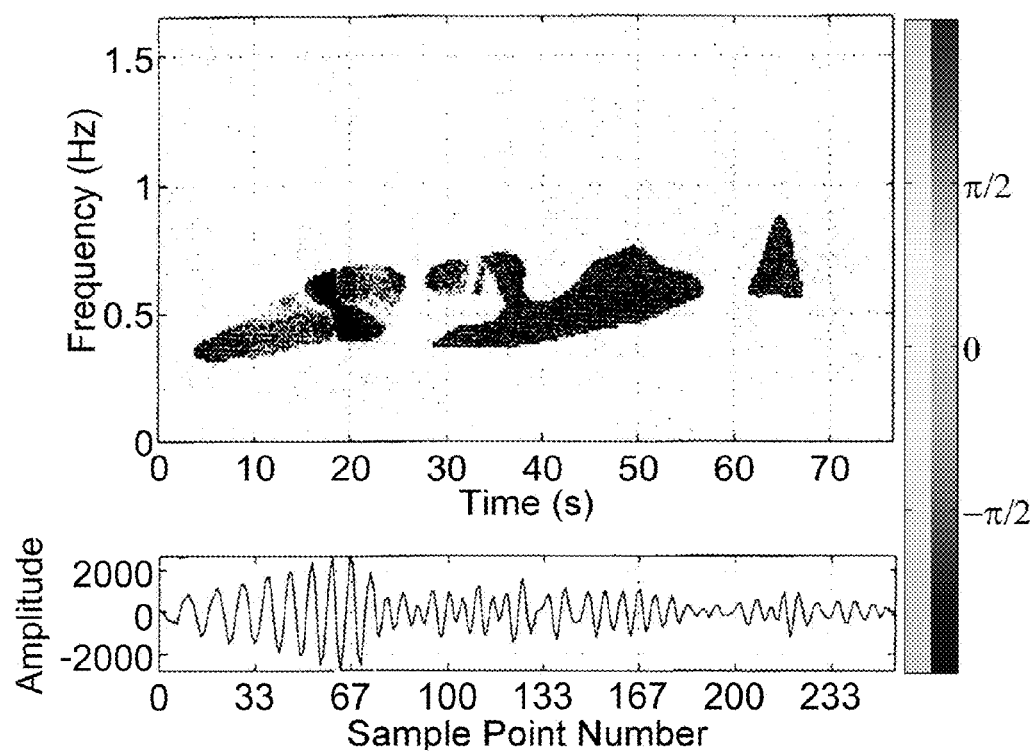

The azimuth of the ascending node S-spectrum $\Omega$ is shown in FIG. 6*b*. As in FIG. 6*a*, the approximately linear particle motion of the Love wave leads to instability in $\Omega$ because noise easily reverses the direction of particle motion from counterclockwise to clockwise and vice versa, causing $\Omega$ to suddenly change by $\pm\pi$. Here, $\Omega$ is approximately $\pi/4$ or $-3\pi/4$, thus the strike of the local polarization ellipse is oriented northeast-southwest. On the Rayleigh wave signature $\Omega$ is approximately constant with a value of approximately $-\pi/4$, or southeast. Since the direction of wave propagation is from northwest to southeast, this demonstrates a retrograde motion of the main Rayleigh wave.

Since Love wave motion is approximately horizontal, it is expected that its largest displacement from $\{0,0,0\}$ lies close to the x-y plane. Thus, on the Love wave signature the S-spectrum of $\omega$ is either approximately 0, or approximately $\pi$, as shown in FIG. 6c. For the Rayleigh Wave $\omega$ is approximately $\pi/2$, which is not surprising since the orientation of the long axis of the polarization ellipse of a Rayleigh wave is approximately vertical.

The phase S-spectrum $\phi$, shown in FIG. 6d, is not well suited for visual interpretation. However, the phase information $\phi$ is used to reliably reconstruct $\vec{r}[\hat{t}T]$ from the information provided by a, b, I, $\Omega$, and $\omega$.

The seismic signal in the above example was deliberately chosen for demonstration purposes due to its small noise content. However, the method for polarization analysis according to the invention is substantially robust in the presence of noise. For example, when Gaussian white noise is added to the seismic signal data to give a Signal-to-Noise Ratio (SNR) of approximately 1, the Love wave and the Rayleigh wave signatures are still clearly visible on the a and b S-spectra, and retain recognizable polarization properties in the I, $\Omega$, and $\omega$ S-spectra.

In polarization filtering a sampled time series $\vec{r}[\hat{t}T]$ is divided into two three-component time series describing a time evolution of separate linear and circular portions of the corresponding continuous time series $\vec{r}(t)$. Returning to continuous time, equation (13) is rewritten such that linear and circular portions of the test ellipse are separated from each other before being rotated giving:

$$\vec{r}'_0(t) = [a(f) - b(f)]\{\cos[2\pi f t - \varphi(f)], 0, 0\} + \quad (26)$$
$$b(f)\{\cos[2\pi f t - \varphi(f)], \sin[2\pi f t - \varphi(f)], 0\}.$$

Applying equations (14)-(18) to equation (26) gives each of $X_R, \ldots, Z_I$ as a sum of two parts arising from the linear and circular portions of $\vec{r}(t)$, denoted by L and C superscripts. For example:

$X_R = X_R^L + X_R^C$, where $X_R^L = [a - b]\cos\varphi(\cos\omega\cos\Omega - \sin\omega\sin\Omega\cos I)$, $X_R^C =$ $b[\cos\varphi(\cos\omega\cos\Omega - \sin\omega\sin\Omega\cos I) + \sin\varphi(\sin\omega\cos\Omega + \cos\omega\sin\Omega\cos I)]$.

The linear and circular portions of the other quantities defined in equation (18) are obtained in a similar fashion. The resulting set of quantities $X_R^L, \ldots, Z_I^C$ is then obtained by calculating $\alpha, \ldots, \phi$ from equations (19) and (20) and substituting the results into equation (27).

The invertibility condition of the discrete S-transform—equivalent to equation (9) sampled in frequency—is:

$$X\left[\frac{\hat{f}}{NT}\right] = \sum_{\hat{t}=0}^{N-1} X\left[\hat{t}T, \frac{\hat{f}}{NT}\right], \text{ or} \quad (28)$$

$$= \sum_{\hat{t}=0}^{N-1}\left[X_R\left[\hat{t}T, \frac{\hat{f}}{NT}\right] + iX_I\left[\hat{t}T, \frac{\hat{f}}{NT}\right]\right].$$

From equations (27) and (28), linear and circular portions of $X[\hat{f}/NT]$ —denoted $X^L[\hat{f}/NT]$ and $X^C[\hat{f}/NT]$ —are obtained as follows:

$$X\left[\frac{\hat{f}}{NT}\right] = X^L\left[\frac{\hat{f}}{NT}\right] + X^C\left[\frac{\hat{f}}{NT}\right], \text{ where} \quad (29)$$

$$X^L\left[\frac{\hat{f}}{NT}\right] = \sum_{\hat{t}=0}^{N-1}\left[X_R^L\left[\hat{t}T, \frac{\hat{f}}{NT}\right] + iX_I^L\left[\hat{t}T, \frac{\hat{f}}{NT}\right]\right];$$

$$X^C\left[\frac{\hat{f}}{NT}\right] = \sum_{\hat{t}=0}^{N-1}\left[X_R^C\left[\hat{t}T, \frac{\hat{f}}{NT}\right] + iX_I^C\left[\hat{t}T, \frac{\hat{f}}{NT}\right]\right].$$

The inverse Fourier transforms of $X^L[\hat{f}/NT]$ and $X^C[\hat{f}/NT]$ then provide $x^L[\hat{t}T]$ and $x^C[\hat{t}T]$, the linear and circular portions of $x[\hat{t}T]$. Similarly, the linear and circular portions of $y[\hat{t}T]$ and $z[\hat{t}T]$ are obtained and, consequently, of $\vec{r}[\hat{t}T]$ such that $\vec{r}[\hat{t}T] = \vec{r}^L[\hat{t}T] + \vec{r}^C[\hat{t}T]$.

Figure 7:
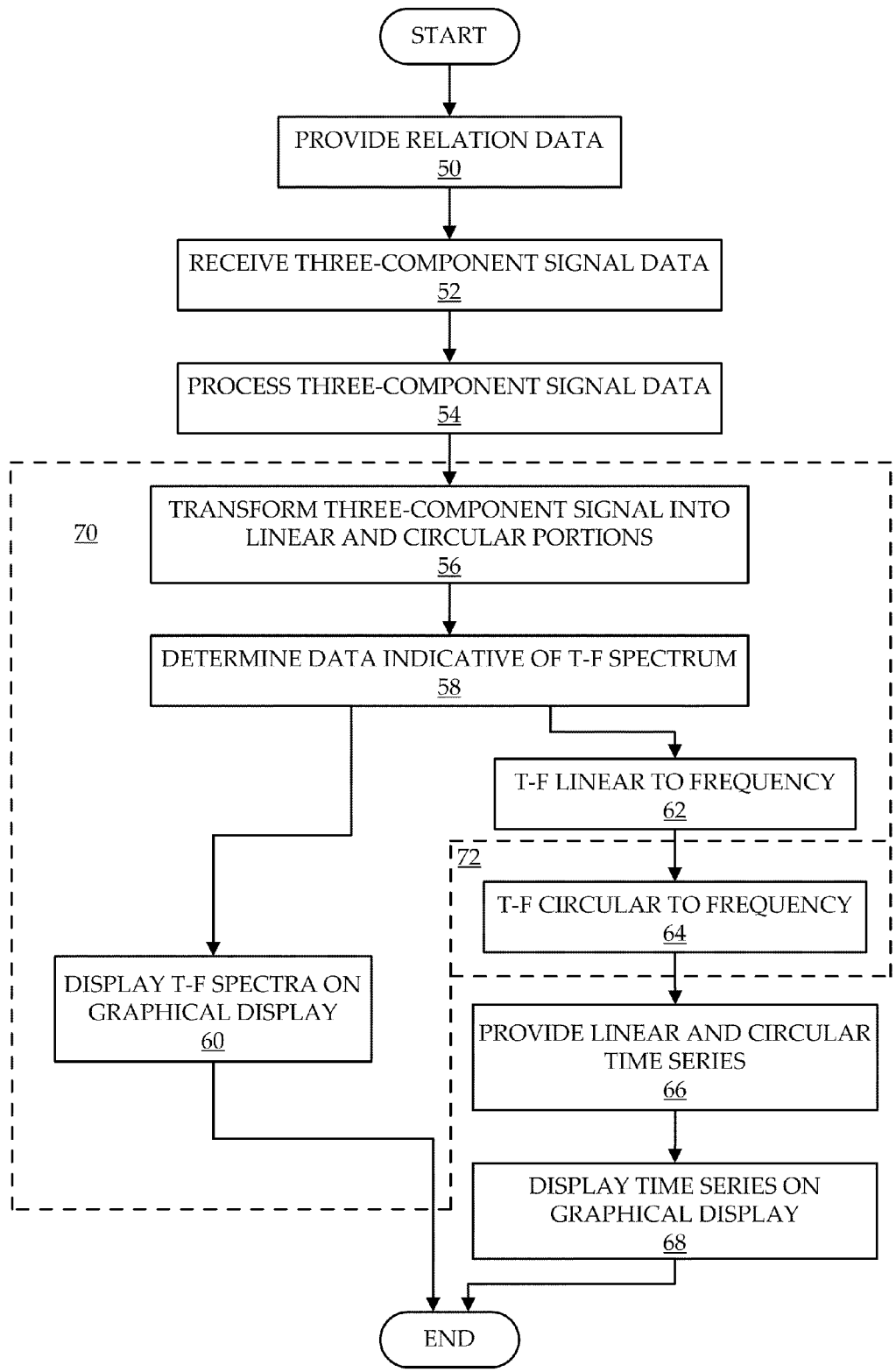
FIG. 7 is a flow diagram illustrating a method of signal processing for polarization filtering according to the invention.

Referring to FIG. 7 a flow diagram of a method for polarization filtering according to the invention is shown. Referring to box 50, relation data indicative of a predetermined expression—equations (19) and (20)—relating ellipse elements describing an ellipse in three dimensional space to time-dependent components of a three-component signal with each component corresponding to one of three coordinates in the three dimensional space are provided. Signal data indicative of a three-component signal with each time-dependent component corresponding to one of the three coordinates in the three dimensional space are received—box 52. The three-component signal is indicative of a characteristic of an object or a physical event. The signal data are then processed—box 54—for transforming each component of the three-component signal into time-frequency domain 70 providing second signal data. In one embodiment, an S-transform is employed because the scalable S-transform window ensures that a same number of cycles of Fourier sinusoids are used to obtain local polarization properties at each time and each frequency. As will become evident to those of skill in the art, the S-transform is easily replaced in the method for polarization analysis according to the invention with another time-frequency transform such as, for example, Short-Time Fourier Transform (STFT), or Gabor Transform (GT). After transformation, the second signal data are processed to divide each of the transformed components of the three-component signal into a linear and a circular portion—box 56—and to determine data indicative of a time-frequency spectrum of the linear and the circular portion of each component of the three-component signal using the relation data—box 58. Using, for example, a graphical display, the time-frequency spectra are then displayed—box 60—enabling a user to extract polarization dependent information therefrom. Referring to boxes 62 and 64, the time-frequency spectrum of the linear and the circular portion of each component of the three-component signal is transformed into frequency domain 72, followed by transformation into time-domain using inverse Fourier transformation. Superposing—box 66—in time-domain the linear and the circular portions of the components, respectively, provides two time series, one for the linear portion and one for the circular portion of the three-component signal. A graphical display of the time series—box 68—results, for example, in plots as shown in FIGS. 8a to 8l.

Figure 8:
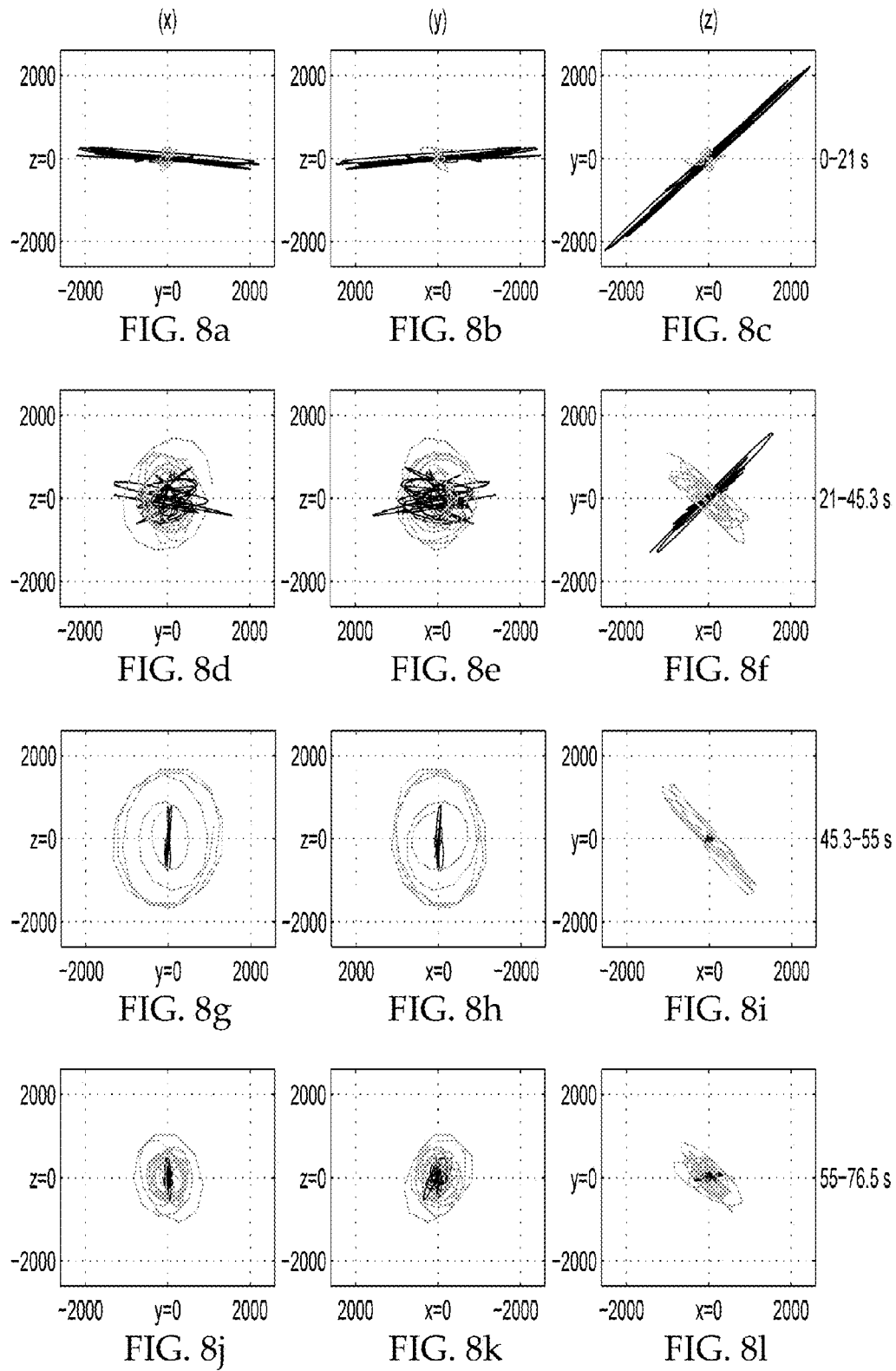
FIGS. 8a to 8l are diagrams illustrating plots of linear and circular portions of the three-component earthquake seismogram shown in FIG. 2; and, FIG. 9 is a simplified block diagram illustrating a system for signal processing using the methods shown in FIGS. 1 and 7 according to the invention.

FIGS. 8a to 8l show plots of $\vec{r}^L[\hat{t}T]$—black lines—and $\vec{r}^C[\hat{t}T]$—grey lines—obtained from the seismogram illustrated in FIG. 2. Each set of three figures shows a different time segment viewed from positive x-, y-, and z-directions, respectively. FIGS. 8a to 8c show the Love wave motion in the first part of the time series. FIGS. 8d to 8f show mixed Love wave and Rayleigh wave motion; the direction of radial motion changes gradually from horizontal to vertical, and circular motion increases in amplitude. FIGS. 8g to 8i show Rayleigh wave motion near its maximum amplitude, and FIGS. 8j to 8l show the final Rayleigh wave motion. The various segments of these time series are, of course, not purely linear or purely circular. If they were purely linear or purely circular it is not possible for $\vec{r}^L[\hat{t}T]$ to change direction and for $\vec{r}^C[\hat{t}T]$ to change amplitude.

Figure 9:
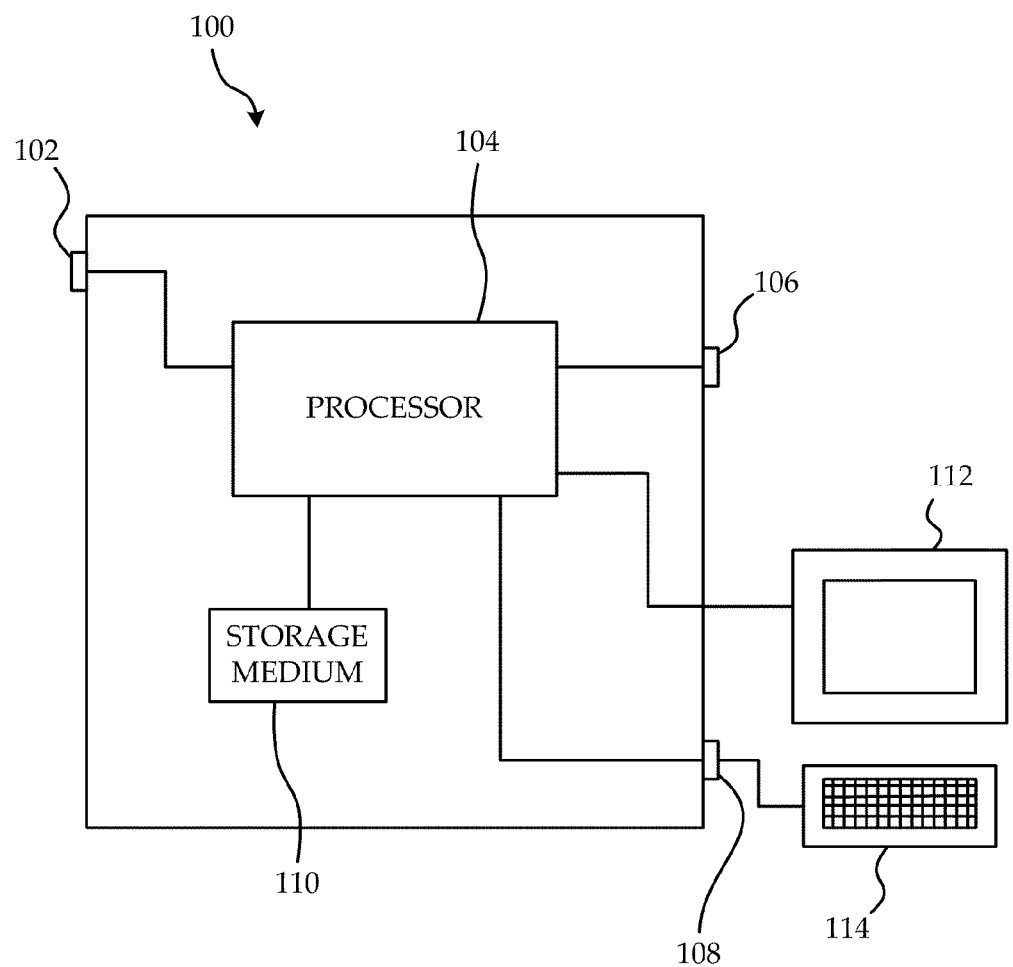

Referring to FIG. 9, a signal processing system 100 according to the invention for implementing the above signal processing methods is shown. Signal data are received at input port 102. Using electronic circuitry such as a processor 104 the signal data are then digitally processed. The system 100 comprises a storage medium 110 having stored therein the relation data and executable commands for execution on the processor 104 for performing the signal processing corresponding to the method for polarization analysis according to the invention and/or corresponding to the method for polarization filtering according to the invention. Alternatively, the processor 104 comprises electronic circuitry designed for performing at least a portion of the signal processing in a hardware implemented fashion. The system 100 further comprises an output port 106 for providing the processed signal data for storage or further processing. The signal processing is controlled by a user viewing, for example, a graphical representation of the signal data and data determined during signal processing steps on display 112, and by providing control commands via port 108—connected, for example, to a keyboard 114—to the processor 104. For example, the display 112 is a graphical user interface facilitating user interaction during signal processing.

The signal processing methods for polarization analysis and polarization filtering according to the invention are highly beneficial in numerous applications for evaluating three-component signal data such as seismology. Furthermore, these methods are not limited to time-dependent components of the three-component signal but are also applicable to three-component signals having space-dependent components. Here, each component of the three-component signal is related to coordinates of a second other space and is transformed into space-frequency domain instead of time-frequency domain. For example, in colour image analysis x, y, and z corresponds to the first space for the three colours red, green, and blue, while coordinates of image pixels in an image plane correspond to the second space. Alternatively, the signal components, their transforms, and the ellipse elements are described using other three dimensional coordinates than Cartesian coordinates such as polar coordinates. Finally, it is noted that an extension of these methods for signals having more than three components may be envisaged, however, inverting the equations (18) will likely be prohibitively laborious—for example, having four components results in 8 non-linear equations to be inverted—and the ellipse elements define the ellipse in, for example, four dimensional space resulting in loss of intuition about a physical meaning of the ellipse elements.

Numerous other embodiments of the invention will be apparent to persons skilled in the art without departing from the spirit and scope of the invention as defined in the appended claims.

What is claimed is:

1. A storage medium having stored therein executable commands for execution on a processor for processing signal data to determine polarization dependent features therefrom, the processor when executing the commands performing:
   a) providing relation data indicative of a predetermined expression relating ellipse elements describing an ellipse in three dimensional space to components of a three-component signal with each component corresponding to one of three coordinates in the three dimensional space, wherein each component of the three-component signal is related to one of time and coordinates of a second other space and wherein each component of the three-component signal is for being transformed into one of time-frequency domain and space-frequency domain;
   b) receiving the signal data, the signal data being indicative of a three-component signal with each component corresponding to one of the three coordinates in the three dimensional space, wherein each component of the three-component signal is related to at least one of time and the coordinates of the second other space, the three-component signal being indicative of a characteristic of one of an object and physical event;
   c) processing the signal data for transforming each component of the three-component signal into one of time-frequency and space-frequency domain, to provide second signal data;
   d) determining polarization dependent features using the relation data and the second signal data, and,
   e) processing the second signal data for dividing each of the transformed components of the three-component signal into a linear and a circular portion.

2. A storage medium as defined in claim 1 wherein c) the processor when executing the commands processes the signal data using an S-transform.

3. A storage medium as defined in claim 1 wherein d) the processor when executing the commands performs determining data indicative of one of a time-frequency and space-frequency spectrum, for at least one of the ellipse elements using the relation data and the second signal data.

4. A storage medium as defined in claim 3 wherein the processor when executing the commands performs graphically displaying the data indicative of the one of the time-frequency and the space-frequency spectrum, for the at least one of the ellipse elements.

5. A storage medium as defined in claim 4 wherein the processor when executing the commands performs:
   determining data indicative of one of a total power time-frequency and a total power space-frequency spectrum, using the second signal data; and,
   indicating in the graphical display of the data indicative of the one of the time-frequency spectrum and the space-frequency spectrum for the at least one of the ellipse elements at least a portion having a total power exceeding a predetermined threshold.

6. A storage medium as defined in claim 3 wherein the processor when executing the commands performs:
   determining data indicative of one of a time-frequency spectrum and space-frequency spectrum, for an ellipse element describing a semi-major axis of the ellipse providing data indicative of a semi-major axis spectrum;
   determining data indicative of one of a time-frequency spectrum and space-frequency spectrum, for an ellipse element describing a semi-minor axis of the ellipse providing data indicative of a semi-minor axis spectrum; and,
   subtracting the data indicative of the semi-minor axis spectrum from the data indicative of the semi-major axis spectrum.

7. A storage medium as defined in claim 1 wherein the processor when executing the commands performs:
   processing the data indicative of the linear and the circular portion of each component of the three-component signal for superposing the linear and the circular portions of the components, providing data indicative of a linear portion and a circular portion of the three-component signal, respectively.

8. A storage medium as defined in claim 7 wherein the processor when executing the commands performs graphically displaying the data indicative of the linear and the circular portion of the three-component signal.

9. A storage medium as defined in claim 8 wherein the data indicative of the linear and the circular portion of the three-component signal are displayed in views along the three coordinates in the three dimensional space.

10. A storage medium as defined in claim 1, the processor when executing the commands performing: determining data indicative of one of a time-frequency spectrum and space-frequency spectrum, of the linear and the circular portion of each component of the three-component signal using the relation data providing linear and circular third signal data.

11. A storage medium as defined in claim 10, the processor when executing the commands performing:
   processing the linear and circular third signal data for transforming the one of the time-frequency spectrum and space-frequency spectrum, of the linear and the circular portion of each component of the three-component signal into frequency domain providing data indicative of a frequency spectrum of the linear and the circular portion of each component of the three-component signal; and,
   processing the data indicative of a frequency spectrum of the linear and the circular portion of each component of the three-component signal for inverse Fourier transforming the frequency spectrum of the linear and the circular portion of each component of the three-component signal into one of a time domain and space domain, providing data indicative of the linear and the circular portion of each component of the three-component signal.

12. A system for processing signal data to determine polarization dependent features therefrom comprising:
   an input port for receiving the signal data, the signal data being indicative of a three-component signal with each component corresponding to one of three coordinates in a three dimensional space, wherein each component of the three-component signal is related to one of time and coordinates of a second other space, the three-component signal being indicative of a characteristic of one of an object and physical event;
   a processor in communication with the input port for:
      receiving relation data indicative of a predetermined expression relating ellipse elements describing an ellipse in the three dimensional space to components of a three-component signal with each component corresponding to one of the three coordinates in the three dimensional space, wherein each component of the three-component signal is related to one of time and coordinates of the second other space and wherein each component of the three-component signal is transformed into one of time-frequency domain and space-frequency domain;
      processing the signal data for transforming each component of the three-component signal into one of time-frequency and space-frequency domain, providing second signal data; and,
      determining data indicative of polarization dependent features using the relation data and the second signal data, and processing the second signal data for dividing each of the transformed components of the three-component signal into a linear and a circular portion;
   a storage medium in communication with the processor having stored therein the relation data; and,
   an output port in communication with the processor for providing the data indicative of polarization dependent features.

13. A system for processing signal data to determine polarization dependent features therefrom as defined in claim 12 wherein the processor comprises electronic circuitry designed for performing at least a portion of processing the signal data and determining data indicative of polarization dependent features.

14. A system for processing signal data to determine polarization dependent features therefrom as defined in claim 12 comprising a control port in communication with the processor for receiving control commands for controlling of processing the signal data and determining data indicative of polarization dependent features.

15. A system for processing signal data to determine polarization dependent features therefrom as defined in claim 14 comprising a graphical display in communication with the processor for displaying the data indicative of polarization dependent features in a graphical fashion.

16. A system for processing signal data to determine polarization dependent features therefrom as defined in claim 15 wherein the graphical display comprises a graphical user interface.

* * * * *

UNITED STATES PATENT AND TRADEMARK OFFICE
CERTIFICATE OF CORRECTION

| | | |
|---|---|---|
| PATENT NO. | : 7,991,589 B2 | Page 1 of 1 |
| APPLICATION NO. | : 11/484681 | |
| DATED | : August 2, 2011 | |
| INVENTOR(S) | : Charles Robert Pinnegar | |

It is certified that error appears in the above-identified patent and that said Letters Patent is hereby corrected as shown below:

Column 15, Line 25    Remove the word "respectively"

Signed and Sealed this
Fourteenth Day of February, 2012

David J. Kappos
*Director of the United States Patent and Trademark Office*